INVENTOR.
LEENDERT de WITTE
BY
ATTORNEY

Feb. 14, 1961 L. DE WITTE 2,972,101
ELECTRIC WELL LOGGING
Filed June 28, 1955 24 Sheets-Sheet 4

INVENTOR.
LEENDERT de WITTE
BY
ATTORNEY

Feb. 14, 1961 L. DE WITTE 2,972,101
ELECTRIC WELL LOGGING
Filed June 28, 1955 24 Sheets-Sheet 6

INVENTOR.
LEENDERT de WITTE
BY
ATTORNEY

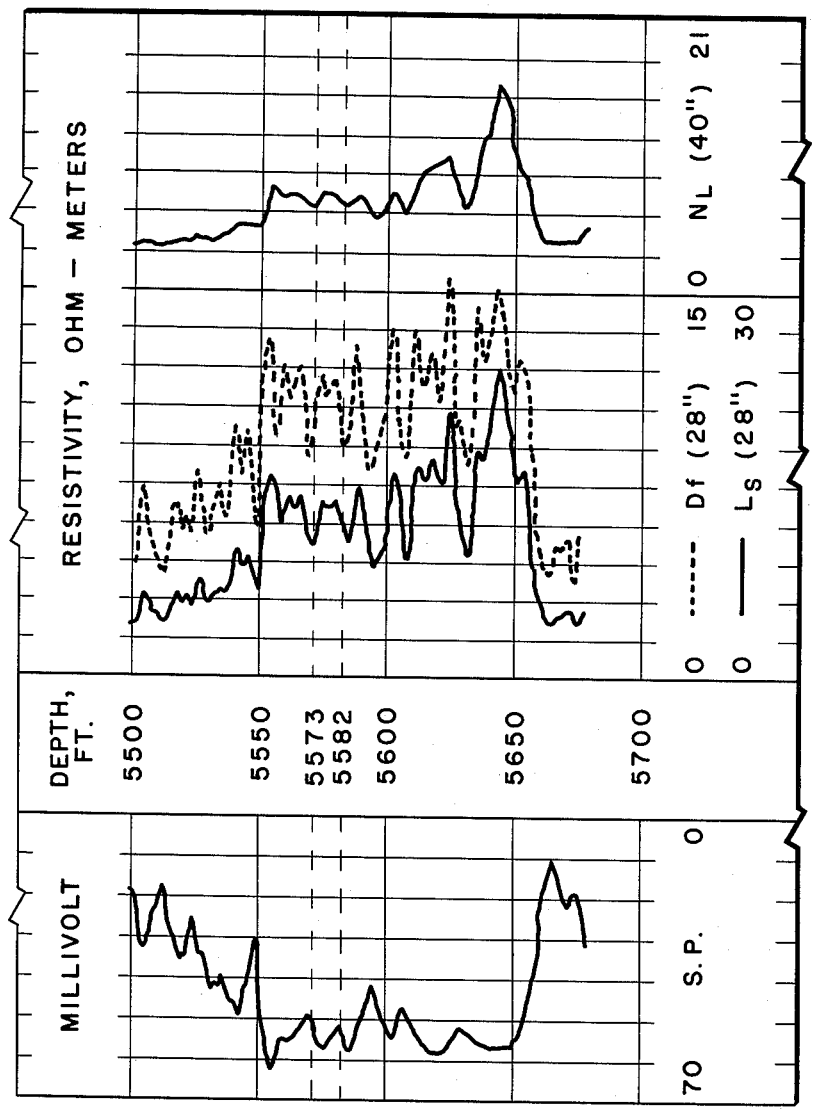

Feb. 14, 1961     L. DE WITTE     2,972,101
ELECTRIC WELL LOGGING
Filed June 28, 1955     24 Sheets-Sheet 9

INVENTOR.
LEENDERT de WITTE
BY
ATTORNEY

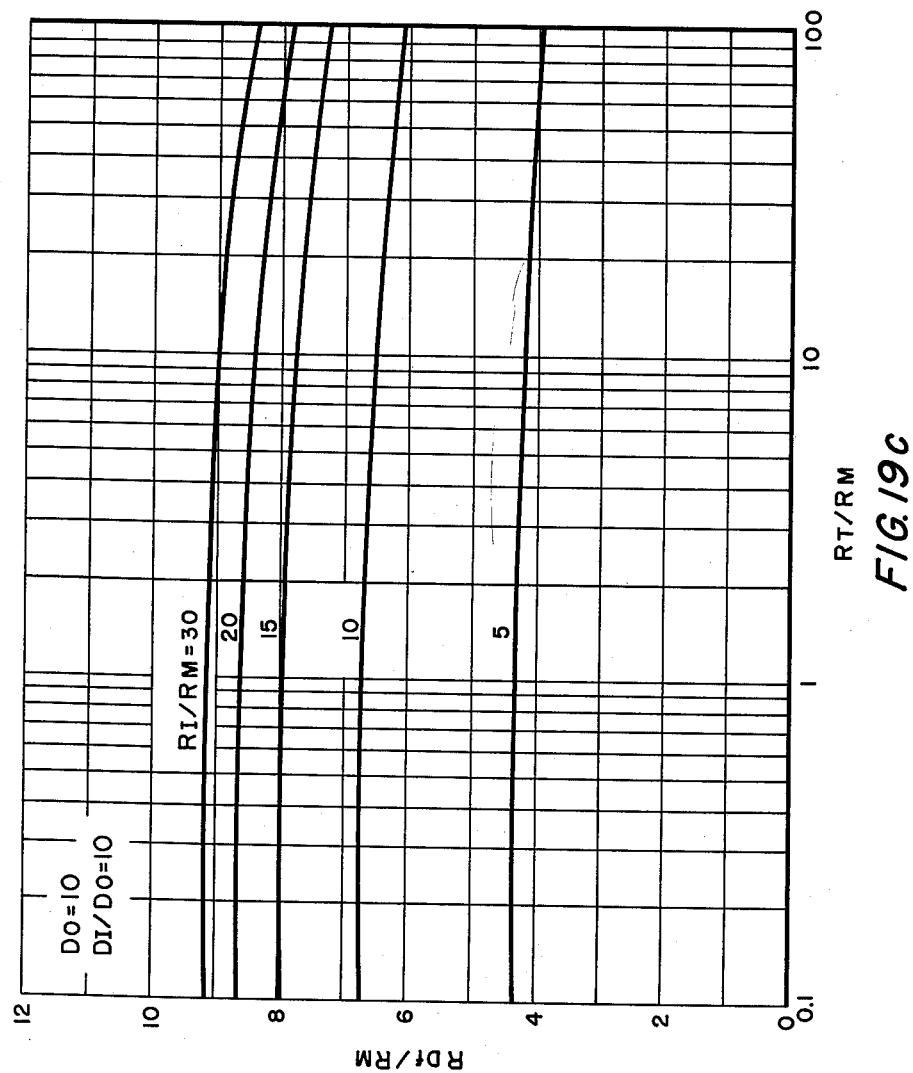

Feb. 14, 1961  L. DE WITTE  2,972,101
ELECTRIC WELL LOGGING
Filed June 28, 1955  24 Sheets-Sheet 19

INVENTOR.
LEENDERT de WITTE
BY *Floyd Trimble*
ATTORNEY

INVENTOR.
LEENDERT de WITTE

Feb. 14, 1961 L. DE WITTE 2,972,101
ELECTRIC WELL LOGGING
Filed June 28, 1955 24 Sheets-Sheet 23

INVENTOR.
LEENDERT de WITTE
BY [signature]
ATTORNEY

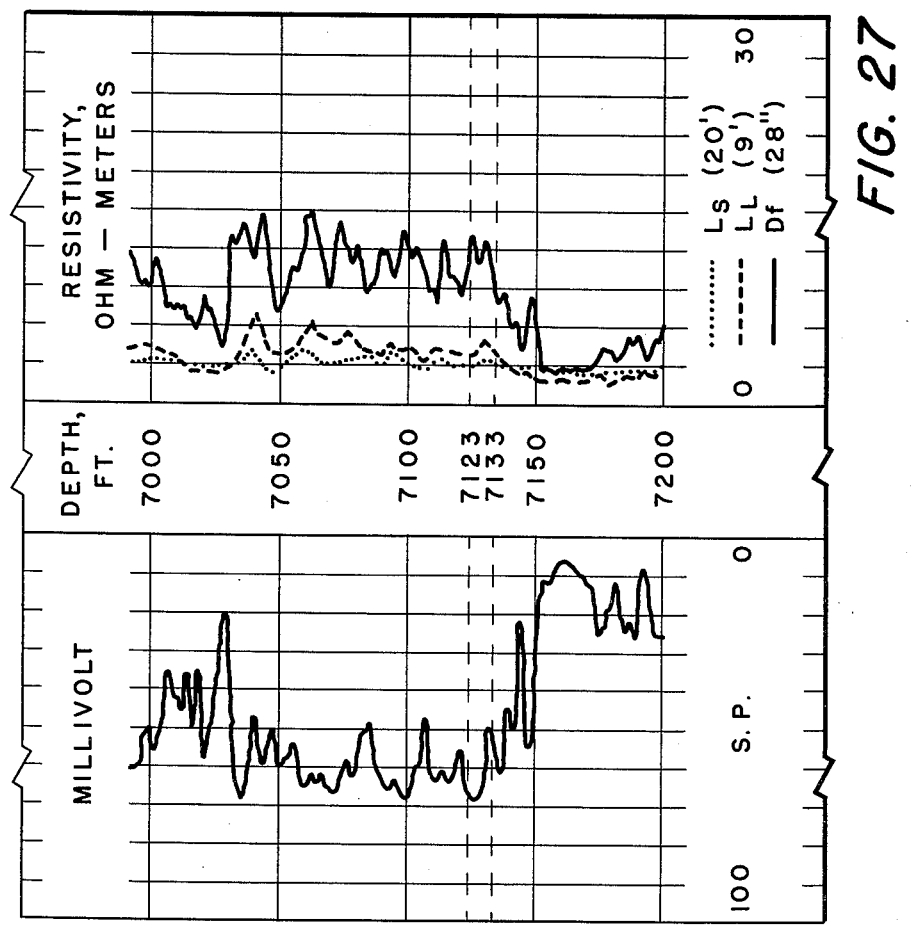

United States Patent Office 2,972,101
Patented Feb. 14, 1961

2,972,101
ELECTRIC WELL LOGGING

Leendert de Witte, Laguna Beach, Calif., assignor to Continental Oil Company, Ponca City, Okla., a corporation of Delaware Filed June 28, 1955, Ser. No. 518,509

6 Claims. (Cl. 324—1)

This invention relates to electro-logging uncased well bores in the earth. More particularly, the invention is concerned with improvements in apparatus and method comprising a more readily correlatable combination of logging means having various radii of investigation.

One object of my invention is to provide an electrode arrangement and logging method whereby a greater resolution and discernment of layered earth structures may be obtained, particularly for discovering the location of petroleum-bearing formations at various levels in the earth.

Another object is to provide a more exact determination of the extent to which the drilling fluid has invaded an earth layer by means of more precise resistivity measurements of invaded and undisturbed zones surrounding the well bore; this objective further provides for the determination of strata porosities necessary for evaluating production from petroleum formations.

The practice of my invention requires the presence of an aqueous fluid in the bore hole, for example, it may be a water-based drilling mud, which if an emulsion, the water will at least be the continuous phase thereof. The well logging operation is made in the presence of such a drilling mud left in the bore hole upon completion, or interruption, of the drilling operation.

A particular feature of my invention consists of a novel logging device for measuring earth resistivity consisting of a plurality of electrodes movably suspended in the bore hole, the arrangement of which responds to the second differential of potential (i.e., to the rate of change of potential gradient) with respect to distance from a reference current electrode within the bore hole. This novel electrode arrangement, referred to hereinafter as the "differential log or Df," has a relatively short radius of investigation which is primarily limited to and influenced by the zone of drilling fluid invasion. The effect of adjacent formations upon my differential log is markedly less than effect upon the conventional short radius logging devices, such as short spaced two-electrode or three-electrode curves. Since the adjacent bed effects on my differential log are relatively small, the recorded log records which I obtain show a greater amount and reliability of detail than conventional resistivity curves, the result of which is a more precise measurement of earth characteristics.

My invention also comprises the foregoing differential logging arrangement used in combination with at least two other conventional types of logging arrangements in a co-operative and correlatable relationship. These additional logging arrangements, will generally be of a deeper but unequal radius of investigation, one of which will be of an intermediate radius while the other will be of a long radius of investigation with reference to the differential log. Such a combination of investigation means provides the logging curves from which a substantially quantitative determination of formation characteristics may be derived. These characteristics are:

(1) Radius of drilling fluid penetration, $D_I$,
(2) Resistivity of the invaded zone of specific earth strata, $R_i$, and
(3) The true resistivity, $R_t$, of the undisturbed earth also with respect to specific earth strata.

The characteristic (2) directly related to formation porosity is a factor of importance to the production evaluation of the petroleum-bearing strata.

Examples of the intermediate radius logging means referred to above include the following types of conventional logging devices:

(a) Short Lateral Log, $L_s$
(b) Short Normal Log, $N_s$
(c) Induction log of a 6-coil configuration, and the like (Doll U.S. Patent 2,582,314)

Examples of the long or deep radius logging devices, also referred to above, include the following types of logging devices:

(d) Long Lateral Log, $L_L$
(e) Long Normal Log, $N_L$
(f) Laterolog
(g) Guard Electrolog, and the like (Owen U.S. Patent 2,446,303)

The dimensional spacing of electrodes in the foregoing intermediate and long radius logging devices will, of course, be selected for co-operative and correlated functioning with dimensional configuration of the differential logging device.

Examples of the differential log used in combination with the foregoing conventional types of logging devices in accordance with my invention are summarized in Table I.

In the logging of a well by the means thus far described, I also include logging of the natural formation potential, S.P., existing in the well bore. In addition to characterizing the earth structures, and S.P. curve serves also for "bench-marking" those log records which are separately recorded on the down and up trips in a well bore. In the latter case the S.P. curve is further useful for aligning the separately taken log records in accordance with matching well depths.

Referring to the drawings:

Figure 1 diagrammatically illustrates a combination arrangement of three logging devices for resistivity logging according to my invention.

Figures 2–13, inclusive, individually illustrate the several types of logging electrode arangements, including variants particularly of the differential log (Figures 4–10 incl.), which are used in accordance with my invention hereinafter more fully described.

Figure 16 is a portion of the logging record obtained by the logging system illustrated in Figure 1.

Figures 26 and 27 illustrate differential logging records obtained in accordance with my invention.

My invention comprises the method of electrical well logging, of well bores or portions thereof filled with a fluid having a continuous aqueous phase, which comprises making a record of the second differential of potential with respect to distance from a reference current electrode.

The differential well logging system, which forms the basis of this invention, is a detailed short radius of investigation device. Various instrumentation forms of it which I have develpoed are illustrated in Figures 4–10. It gives a log of the second differential of potential in the electric field around a current electrode, with respect to the distance from the current electrode. The differential log has a shorter radius of investigation than either the conventional short normal log or the short lateral log. After a hole correction is applied to the logging curves recorded thereby, it gives an improved and reasonably accurate measure of the resistivity of the zone invaded by the drilling fluid. In regions of intermediate and high formation resistivities, a weighting factor is applied to one of the component voltages of the differential logging signal before subtracting from it a second voltage component of the system. This increases somewhat the radius of investigation but improves the resolution with which the invaded zone resistivity can be determined.

Another outstanding feature of my differential logging system is the reduction of adjacent bed effects, when compared to the conventional short normal and short lateral logging systems. The result is that the differential curves show such a greater amount of detail that the differential log becomes a more reliable tool in the analysis of earth starata, the effectiveness of which is particularly striking in the case of thin strata.

Figures 2, 3, 4:
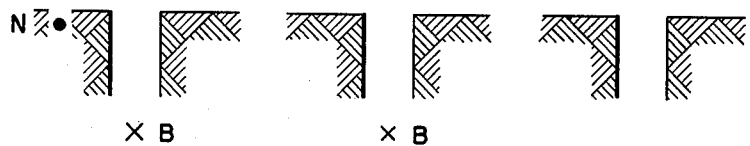

Conventional resistivity logging systems usually employed consist of the following types:

(1) The long lateral shown in Figure 3 having an AO spacing of 15 to 24 feet, (2) The intermediate lateral also in Figure 3 having an AO spacing of 8 to 10 feet, (3) The long normal shown in Figure 2 having an AM spacing of 38 to 64 inches, and (4) The short normal, also in Figure 2, having an AM spacing of 8 to 22 inches.

The long lateral serves as a deep radius of investigation device to furnish some approximation of the true or undisturbed formation resistivity. The long normal as well as the intermediate lateral have been considered to be the second best system for deep radius investigation particularly in beds of limited thickness of the order of 20 feet. In thick beds of the order of 40 feet or thicker, the long lateral and long normal systems combined, may permit some crude guess as to the relative effects of the drilling fluid invasion of the formation. Finally, the short normal system serves as a short radius investigation device, supposedly being influenced mainly by the resistivity of the zone invaded by drilling fluid. As the invaded zone resistivity is related to the product of mud resistivity and a formation factor (the latter is a function of porosity), the short normal log is expected to be some measure of the porosity or "lithology" of the formations traversed by the bore hole; this is the main function of the short investigation log in conventional resistivity well logging.

However, even after a correction for hole effects, the short normal log gives in most cases a very poor approximation of the invaded zone resistivity and as such is unreliable for the evaluation of the lithology and formation factors of earth strata.

It is also recognized that a short lateral (of AO spacing 8 to 30 inches) may be employed as a short radius investigation device to somewhat better advantage. After correction for hole effect, the short lateral logs give a closer approximation to the invaded zone resistivity than the short normals, although still not of the desired degree of accuracy.

Another function of the short normal log in conventional logging is to provide detail as to the bedding of earth strata. The reason for the detail given by the short normal log is that, for any given bed thickness, the adjacent bed effects will be smaller for a small electrode spacing than for a long spacing. It is obvious that with smaller adjacent bed effect, there will be less averaging between successive layers of earth structure, thus the detail presented in the logging curves will be more representative of the individual earth layers depicted.

TABLE I

Figures 11, 12, 13:
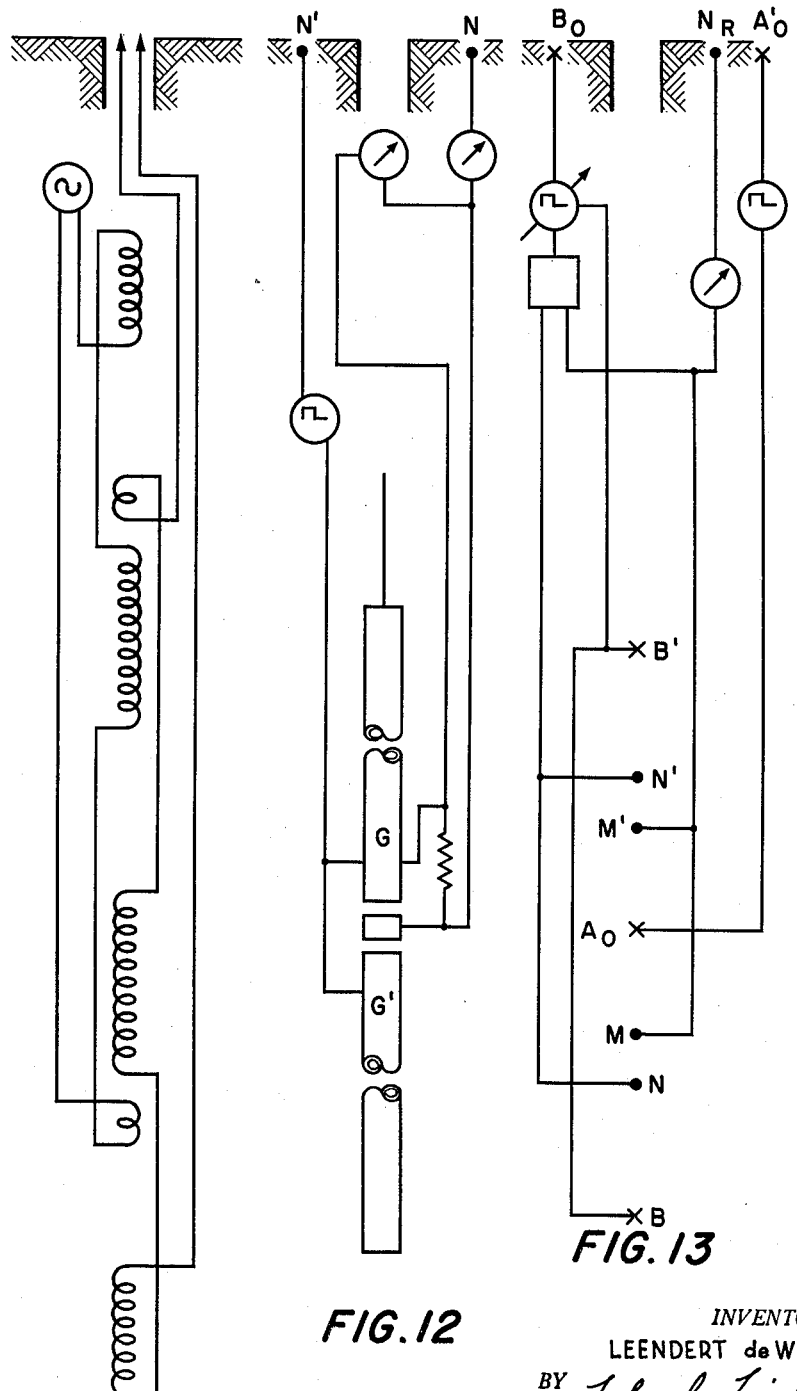

| Radius of investigation [1] | Electrode arrangement | | | | |
|---|---|---|---|---|---|
| 1. Short.—The resistivity measurement is mainly influenced by the zone of drilling fluid invasion. | ← | | Second Differential Log.—Measures the resistivity as a function of the rate of change of potential gradient with respect to distance from the current electrode pair. | | → |
| 2. Intermediate.—The resistivity measurement is an average of the zone invaded by drilling fluid and of the undisturbed formation beyond this zone. | Short Lateral Log.— The lateral configuration measures the resistivity as a function of potential gradient with respect to distance from a current electrode. AO spacing is 8 to 40 inches. See L$_S$ of Fig. 3. | Induction Log, e.g., 6-Coil Doll.—For use in areas of low resistivity and/or thin beds. Longitudinal focussing for clear discrimination of strata. See Fig. 11. | → | Short Lateral Log.— AO spacing is 8 to 40 inches. The lateral configuration measures the resistivity as a function of potential drop with respect to distance from a current electrode. See L$_S$ of Fig. 3. | Short Normal Log.— AM spacing is 8 to 25 inches. See N$_S$ of Fig. 2. |
| 3. Long.—The resistivity measurement is mainly influenced by the undisturbed formation beyond the zone of drilling fluid invasion. | Long Normal Log.— AM spacing is 35 to 60 inches. See N$_L$ of Fig. 2. | → | Laterolog or Guard Electrolog, e.g., Owen U.S. Patent 2,446,303.—Either is very efficient in areas thinly bedded strata. Fig. 13 shows Laterolog, Fig. 12 shows Guard Electrolog. | → | Long Lateral Log.— AO spacing is 8 to 25 feet; see L$_L$ of Fig. 3. The lateral configuration measures the resistivity as a function of potential drop with respect to distance from a current electrode. |

[1] By "radius of investigation" means that distance beyond which the material of the adjacent formations contributes less than about 10 percent of the logging signal.

It is also generally known that a short lateral log of a given electrode spacing has less adjacent bed effects than a short normal of the same spacing and therefore gives the more detailed logging curve.

The normal log gives essentially a measurement of the potential on the axis of the drill hole at a distance measured from a single current electrode. This potential is compared with the potential of an infinitely removed electrode which (for practical purposes) can be taken to be at zero potential on the earth's surface; see Figure 2.

The lateral log measures resistivity as a function of the difference in potential between two closely spaced points on the axis of the hole spaced at a given distance from a single current electrode. The return current electrode is far enough removed so that its influence can be neglected in most cases; see Figure 3. An alternative and equivalent arrangement of the lateral device is that a single potential measurement is made at given distance from a closely spaced pair of current electrodes; that is to say, the function of current and pick-up electrodes is equivalently reversible.

Figure 2 shows an electrode arrangement for the normal device. Figure 3 shows an electrode arrangement of the lateral device. Pick-up electrodes are designated by M and N (·); current electrodes are designated A and B (x). In the lateral arrangement, a much larger percentage of the current flows in the immediate vicinity of the electrode system than in the case of the normal arrangement. For this reason, the current distribution, and therefore the measured potential, for the lateral logging device is more strongly influenced by the immediate surroundings of the electrodes and is less affected by the more remote layers of the formations than is the normal logging device. The greater relative influence of the region in the immediate vicinity of the electrodes accounts for both the shorter radius of investigation and the smaller adjacent bed effects of the lateral log (as compared with the normal log of the same spacing).

Thus, in conventional logging when going from measurements of potential to measurements of potential gradient, the radius of investigation and adjacent bed effects are decreased. I have found that these tendencies will be even more pronounced when going to a measurement of the second differential of potentials, i.e., a measurement of the rate of change of potential gradient with respect to distance from a current electrode.

Thus it is that I have devised an electrode arrangement for measuring the second differential of potential which I have designated herein elsewhere as the differential log. In beds of very high resistivity it is advantageous to purposely distort the differential measurement because is such beds the potential gradient in the hole approaches a linear function of the distance from the current source and hence the rate of change of the gradient approaches zero. The following is a discussion of several of the various electrode configurations which may be used in recording the differential log. Also included in these discussions are discussions of the ways in which the differential log may be distorted, for each of the configurations.

*One pair of current electrodes and one pick-up span*

The simplest form of differential logging device consists of a four-electrode configuration; movably suspended in the bore hole. The electrodes are disposed in pairs, two electrodes in each pair. One pair constitutes the current electrodes and the other pair, the pick-up span as illustrated in Fig. 4. As described above, column 5, lines 12 to 22, the potential at M in Fig. 4, due to the electrode pair A—B and relative to any reference potential which may be desired, for example, relative to the potential of an infinitely removed electrode which (for practical purposes) may be taken to be a zero potential on the earth's surface is a measurement of the potential differential at M due to a single current source at O'. Likewise, the potential at N in Fig. 4 is a measurement of the potential differential at N relative to the same reference potential used for determination of the potential differential at M and due to a single current source at O'. The measurement of the difference in potential between M and N is hence a measurement of the second differential of potential at O due to a single current source at O'.

Figures 8, 9, 10:
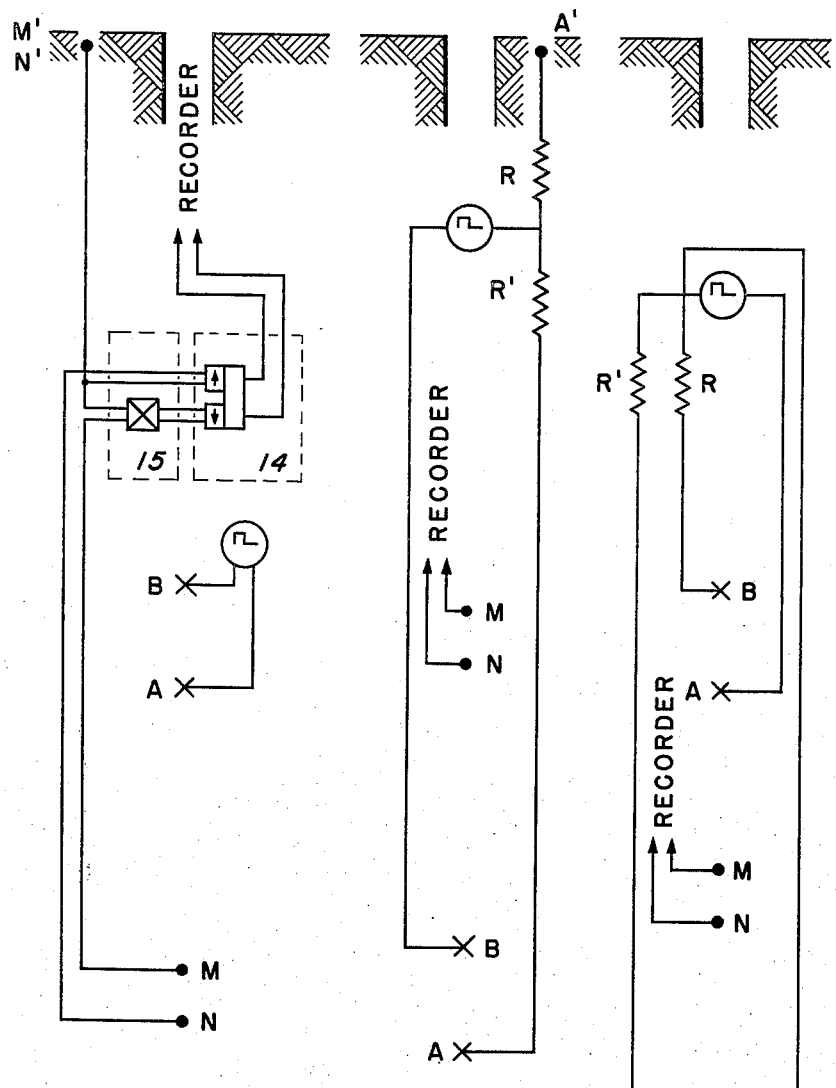

With reference to Fig. 8 wherein is shown an apparatus for asymmetrically weighting the differential measurements obtained by the apparatus in Fig. 4, the potentials at each of the electrodes M and N are measured with respect to an infinitely remote point, for practical purposes, the electrode M'N' on the surface of the earth. One of these potentials is then amplified before the two are subtracted. In the preferred dimensions for the configuration illustrated in Fig. 4, the spacing between the electrode pairs from center to center of each pair should be of the order of 20″ to 40″, while the distance between the electrodes of one pair should be 4″ to 8″ and does not necessarily have to be equal for the current electrode pair and the pick-up span.

In this configuration we subtract the potential gradients between the points M and N due to the electrodes A and B and so form a measurement of the second differential of potential with respect to the spacing from a single point current source.

Figure 5:
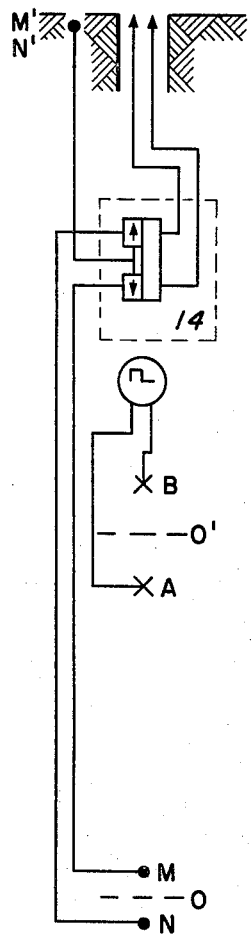

In the configuration illustrated in Fig. 5 the potential differences between M and N and the remote ground electrode M'N' are detected separately. Then potential differences are subtracted electrically by opposing the signals in the primary of a transformer and measuring the difference as the output of the secondary. This system gives identical results to the arrangement of Fig. 4 but is easier adapted to the asymmetrical weighting of the signals as described in connection with Fig. 8. The differential log obtained with this electrode configuration may further be asymmetrically weighted by employing the surface electrode A' and wiring conguration illustrated in Fig. 9. Here all of the current from the commutated D.C. source is passed through the electrode B while the return current passes partially through electrode A and partially through the remote ground electrode A'. The proportion of the currents passing between electrodes A and B can be chosen arbitrarily by proper selection of the line resistors R and R'.

*One pair of current electrodes and two pick-up spans*

Figure 6:
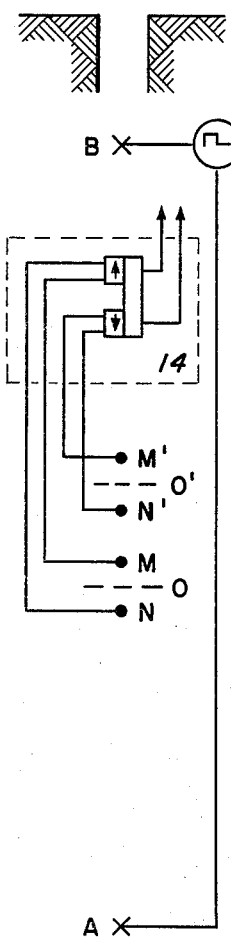

With reference to Fig. 6, A and B are two current electrodes and M—N and M'—N' are two pick-up spans symmetrically located in the field between A and B. In this configuration, the potential difference across the span M—N is measured giving a measurement of the potential gradient of the field at O; likewise the potential difference between M' and N' gives a measurement of the potential gradient at O'. These two potential gradients are then subtracted giving a measurement of the rate of change of the potential gradient of the field at the mid-point between O and O'.

Asymmetrical weighting of this configuration is accomplished by amplifying the signal from one of the pick-up spans before those signals are subtracted.

*Two pairs of current electrodes and one pick-up span*

Figure 7:
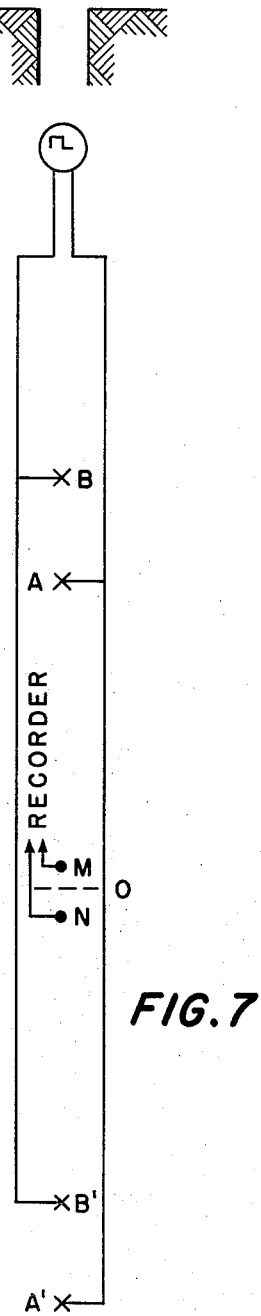

With reference to Fig. 7, A and A' and B and B' form corresponding electrodes of two current pairs and the pick-up span M—N is symmetrically located between them. The measurement of the potential difference between M and N gives a measurement of the rate of change of potential gradient at O due to a current source because: the measurement of the potential difference between M and N due to the pair A—B' represents a measurement of the potential gradient at O due to a symmetrical current source; likewise, the measurement of the potential differential between M and N due to the pair A'—B gives a measurement of the potential gradient at O due to a symmetrical current source. Because the pairs A—B' and A'—B together create a single field at O, the potential difference between M and N is a function of the rate of change of the potential gradient at O due to current sources symmetrical with respect to O.

The differential log produced by this electrode configuration may be asymmetrically weighted by utilizing the wiring configuration with its resistance illustrated in Fig. 10. Two equal voltage sources are connected to electrodes B and B' respectively, through conductors and line resistors R and R'. The resistances of the conductors connecting the return electrodes to the source are approximately equal. The ratio of the currents in the symmetrical spans A—B and A'—B' again can be adjusted by proper selection of the resistors R and R'.

The preferential weighting of the differential log is analogous to mixing the characteristics of the differential log with that of the short lateral curve.

The increased detail of the differential curve as shown in Fig. 16 is very useful for detailed correlations and sand counting. An even more important aspect is the reduced adjacent bed effect, which makes the differential log more reliable for the quantitative evaluation of thin beds. For a bed of 6 feet or thicker, the adjacent bed effects on the 28-inch differential log are usually small enough to be neglected.

The production of the well logging record reproduced in Fig. 16 and its interpretation in conjunction with the departure curves reproduced in Figs. 17A–19C are demonstrated in the following example:

EXAMPLE I

Figure 1:
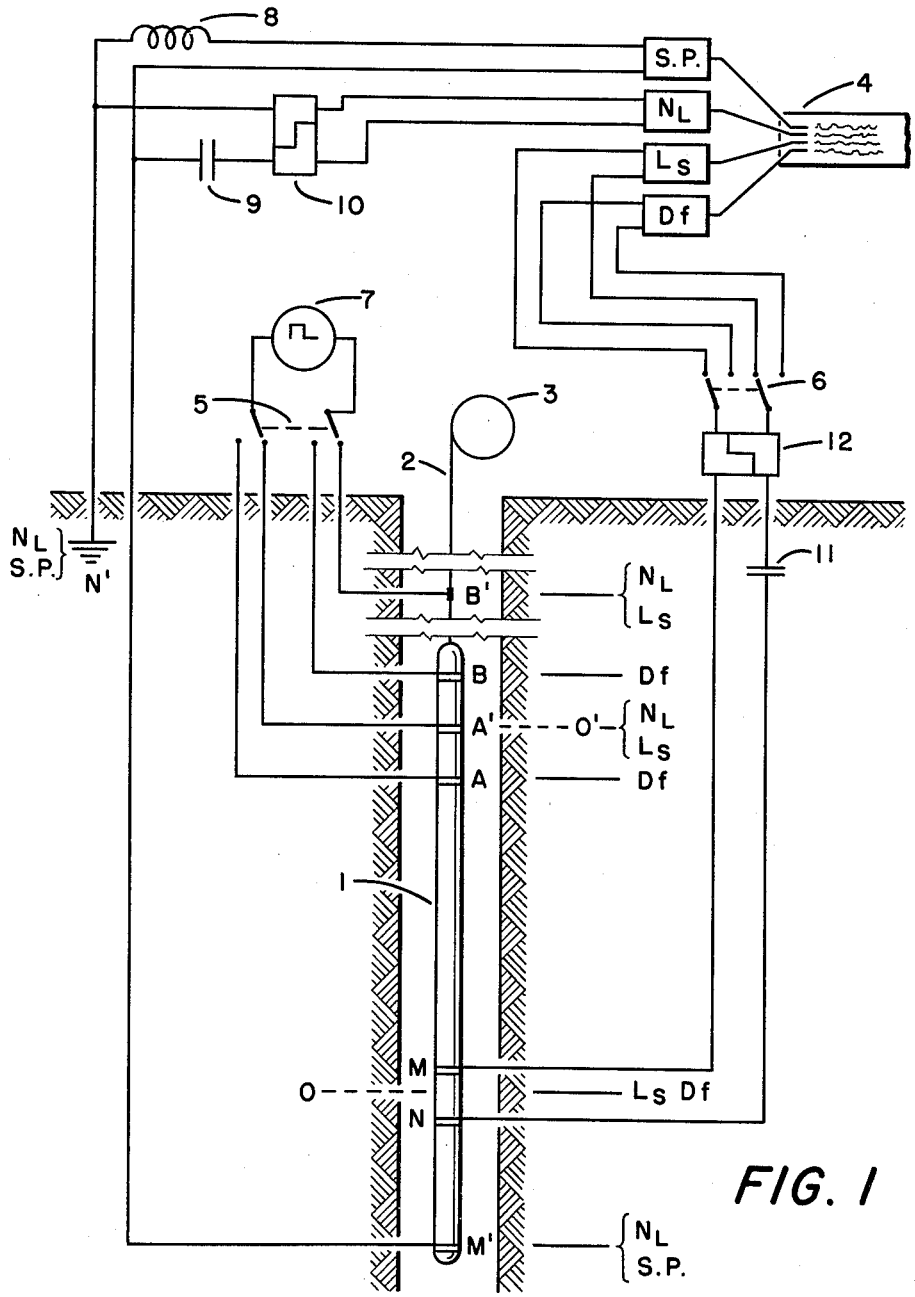

Refer now to Figure 1 wherein there is diagrammatically illustrated a well logging arrangement used to secure the logging record shown in Figure 16. In this arrangement I have positioned six electrodes upon a common carrier or sonde 1 suspended by cable 2 from drum reel 3. The positioning of the electrodes cooperatively combines the operation of a 28-inch differential log, a 28-inch short lateral log, and a 40-inch long normal log; the sonde-, surface-, and cable sheath-electrodes associated with each logging arrangement are respectively designated in Figure 1 by the abbreviations, $Df$, $L_S$, and $N_L$.

The dimensional configuration of electrodes employed in this well logging operation, again with reference to Figure 1, are as follows:

*Differential log.*—The differential configurations used consisted of the pair of current input electrodes, A—B, having a span of 4 inches, and the pair of current pick-up electrodes, M—N, having a span of 8 inches, and all of which were located on the well sonde 1. The span-centered spacing, O—O', of this system was 28 inches.

*Short lateral log.*—The lateral configuration used consisted of (1) the current input electrodes, A' on the well sonde midway between the differential input pair and B' located on the insulated sheathing of cable 2, and (2) the pair of current pick-up electrodes, M—N, also used in the differential configuration. The spacing, A'—O, of this configuration was 28 inches.

*Long normal log.*—The normal configuration used consisted of (1) the same current input electrodes, A'—B', common to the short lateral just described, and (2) the current pick-up electrodes, M' on the sonde 1 and N' on the surface of the earth considered to be at an infinite distance; the spacing of this configuration, A'—M', was 40 inches.

A spontaneous potential curve is also shown in Figure 16. The electrodes in Figure 1 used for S.P. logging are M'—N' detecting earth-generated direct current.

Upon completion of drilling and with the hole filled with drilling mud, the operation of the logging system illustrated in Figure 1 is as follows: The sonde 1, supported by cable 2 from drum 3 is being lowered into a well and the S.P., $N_L$, and $L_S$ logging responses are being recorded by conventional recording apparatus 4; note that $N_L$ and $L_S$ electrodes are made operative through switches 5 and 6. Power source 7 is a commutated D.C. current. The pick-up electrodes M'—N' are responsive to simultaneously induced S.P. and $N_L$ signals. The signals transmitted on a common pair of conductors are separated by filter coil 8 which passes to recorder 4 only the S.P. direct current generated in the earth, whereas condenser 9 passes only the commutated $N_L$ signal induced by current source 7 whereupon this $N_L$ signal is converted to D.C. current by rectifier or recommutator 10 and fed to recorder 4. The commutated $L_S$ signal is filtered from D.C. earth current and rectified through condenser 11 and rectifier 12, and fed to recorder 4 as shown. Upon completion of down-hole logging, the switch pairs 5 and 6 are set to pass current and signals of the $Df$ logging electrodes; as sonde 1 is moved up the hole, recorder 4 is responsive only the S.P. and $Df$ signals.

The two logging records thus obtained are combined, corresponding hole depth of each having been matched by means of the S.P. curve on each. A section of such a logging record at a depth of 5,500 to 5,700 feet is reproduced in Figure 16.

It is desired to determine such properties as the depth of drilling fluid invasion, $D_I$, the electrical resistivity of the invaded zone, $R_I$, and the resistivity of the undisturbed zone, $R_T$, in the depth interval of 5,573–5,582 feet from the log record, Figure 16. These properties are to be ascertained from the following observed data:

Temperature at the zone of interest _____° F__ 132
Resistivity of the drilling mud, $R_M$, at 132° F.
  ohm meter__ 1.7
Diameter of drill hole, $D_O$_____inches__ 10

*From log curves, Figure 16, the following—*

Differential resistivity, $R_D$, max_____ohm meter__ 11.32
Short lateral resistivity, $R_L$, max_____do____ 13.5
Long normal resistivity, $R_N$, max_____do____ 7.4

These resistivities were divided by the mud resistivity to obtain the following ratios for use with the departure curves in Figures 17A–19C:

$R_D/R_M = 6.66$    $R_L/R_M = 7.94$    $R_N/R_M = 4.35$

Setting up the following table on the basis of simple assumed values for ratio of invaded zone diameter/hole diameters, $D_I/D_O$, the values of the succeeding columns of the pertinent designated ratios are obtained from the appropriate $D_I/D_O$ departure curves in Figures 17A–19C.

| $D_I/D_O$ | Fig. | $R_I/R_M$ | $R_T/R_M$ | $R_D/R_M$ |
|---|---|---|---|---|
| 2 | 17A–C | 15 | 2.0 | 6.7 |
| 2.2 | | 14.4 | 1.95 | 6.66 |
| 4 | 18A–C | 9 | 1.5 | 6.3 |
| 10 | 19A–C | 8 | 0.4 | 5.9 |

Figure 17A:
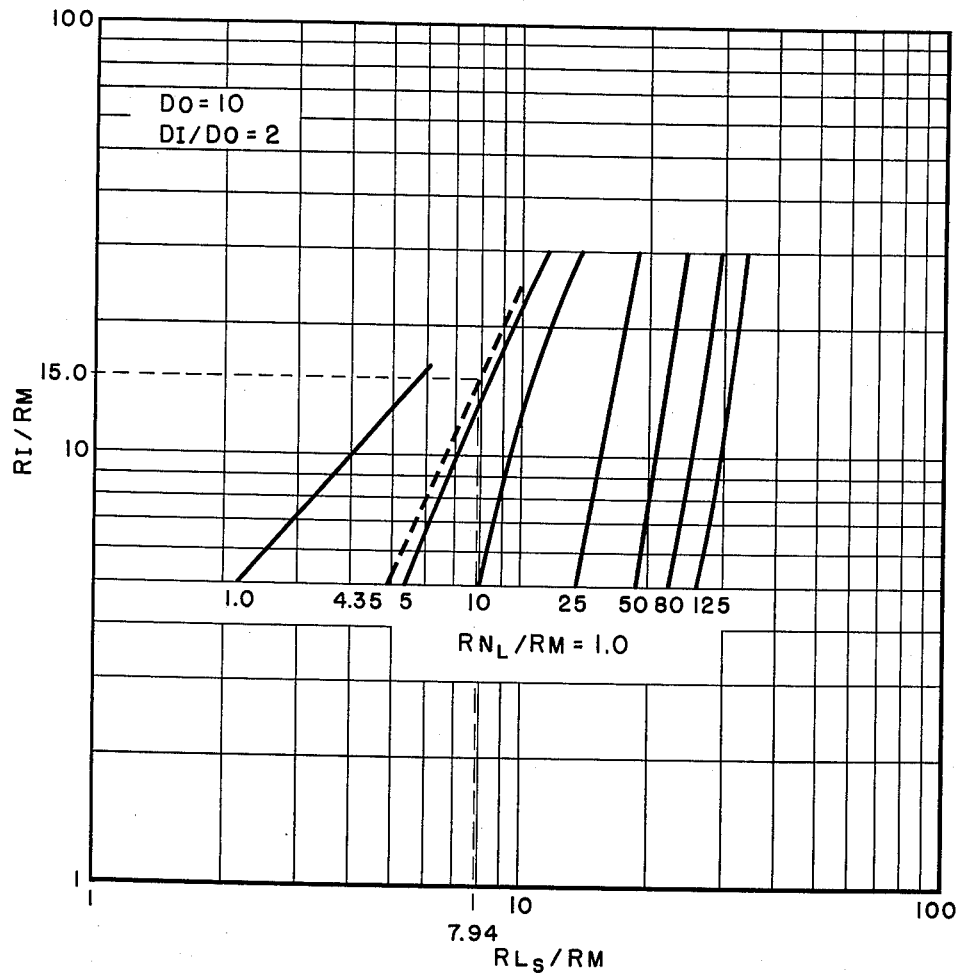
Figures 17–19 (sections A, B, and C of each) illustrate the charts employed to derive the desired formation characteristics by use therewith of the logging record shown in Figure 16.
Figure 17B:
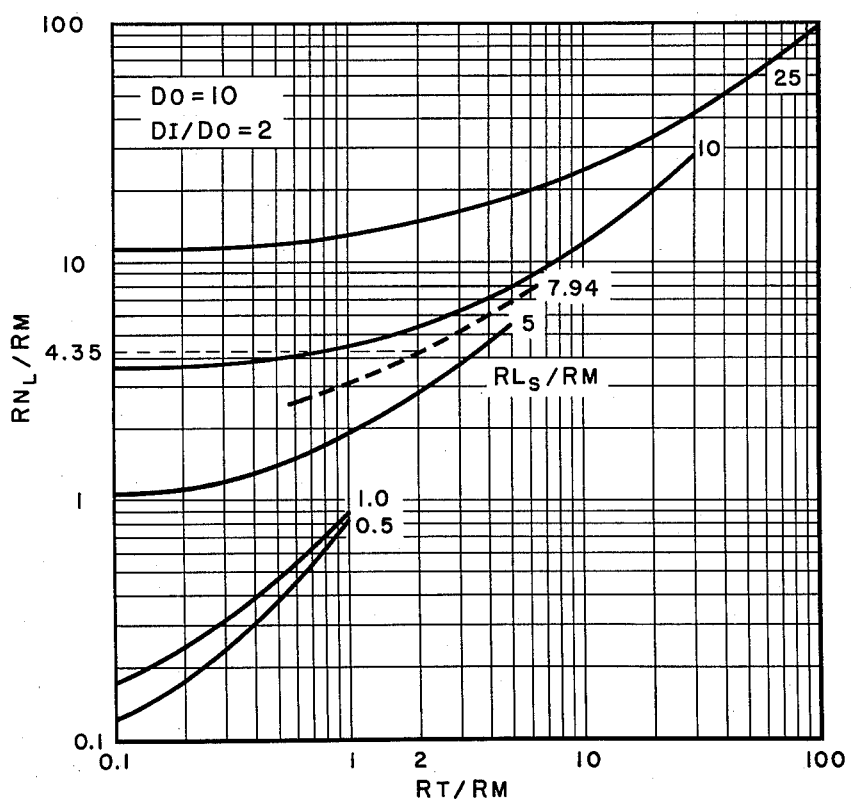
Figure 17C:
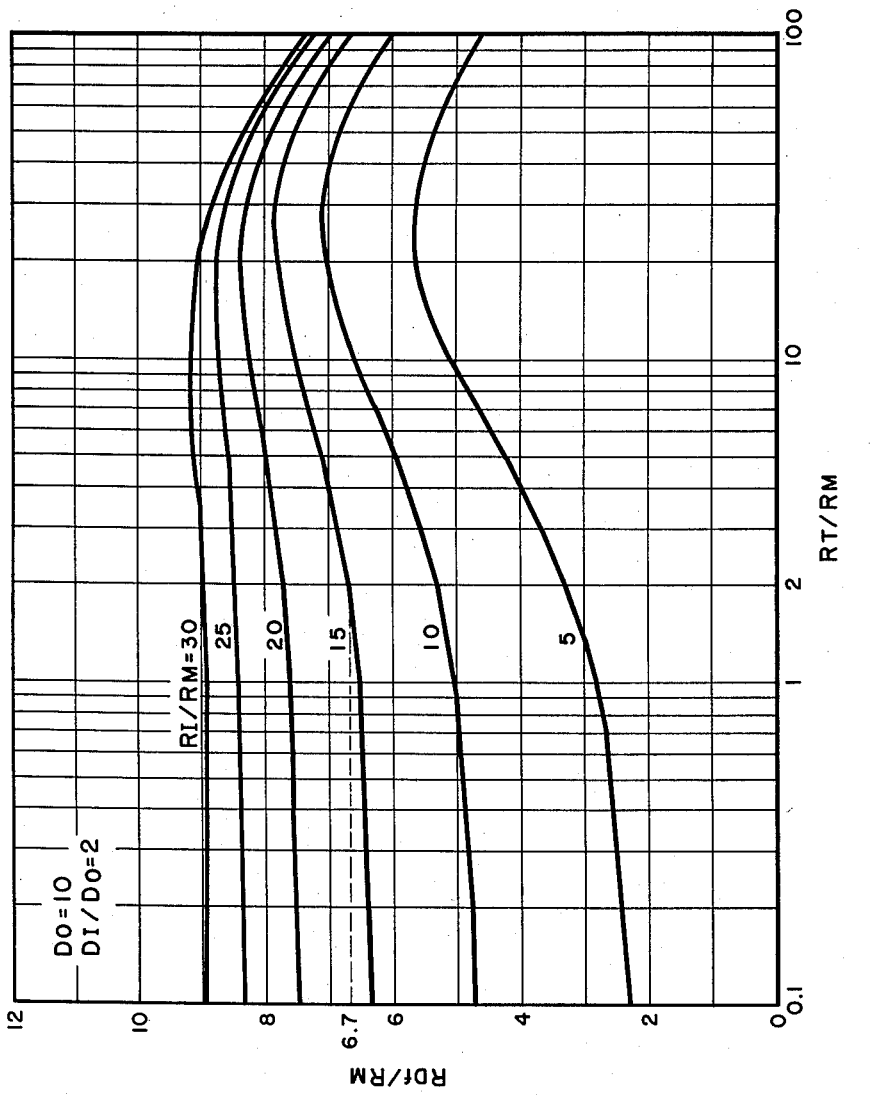
Figure 18A:
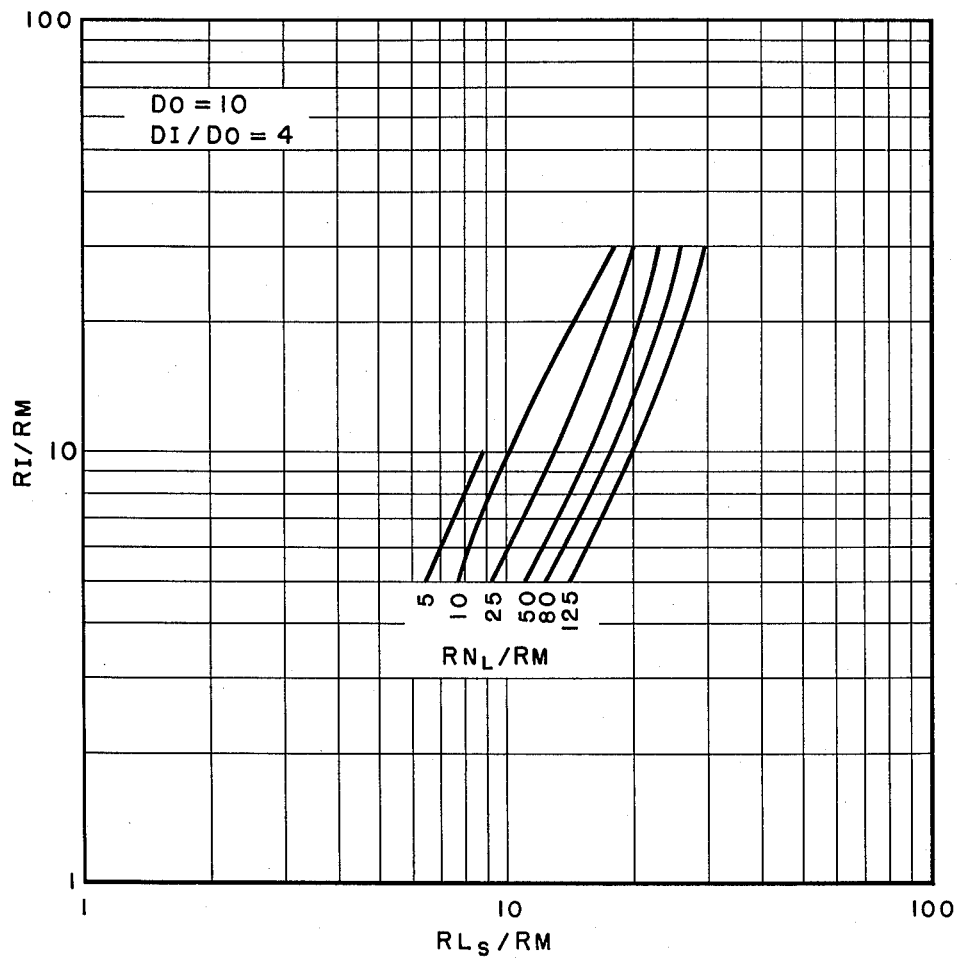
Figure 18B:
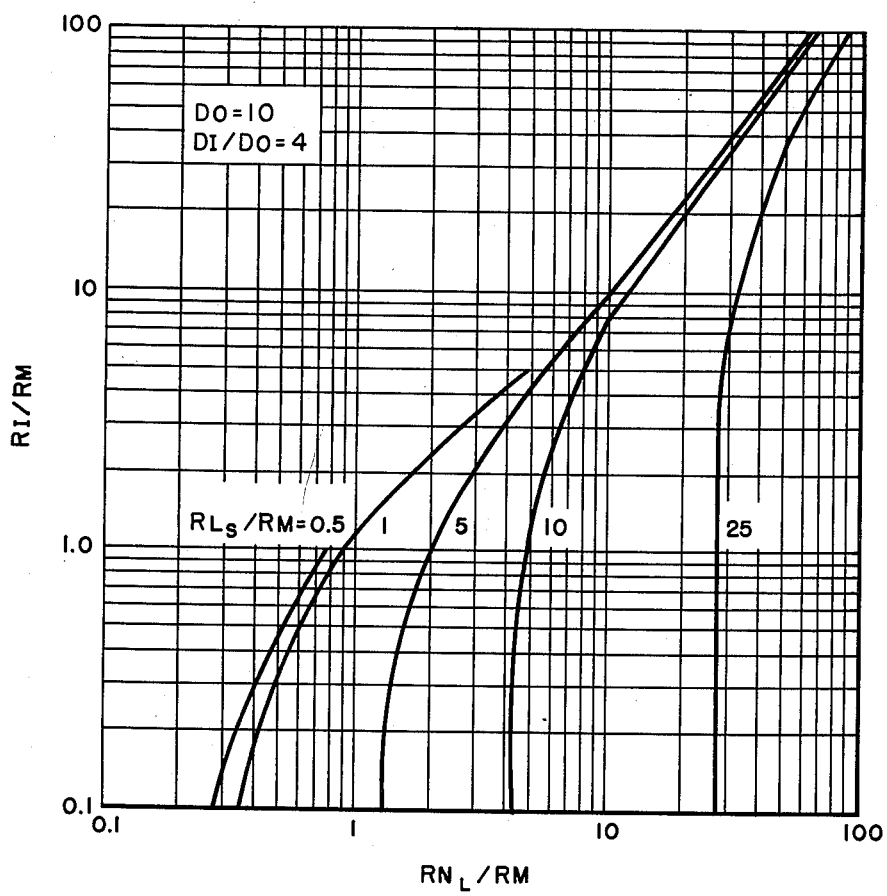
Figure 18C:
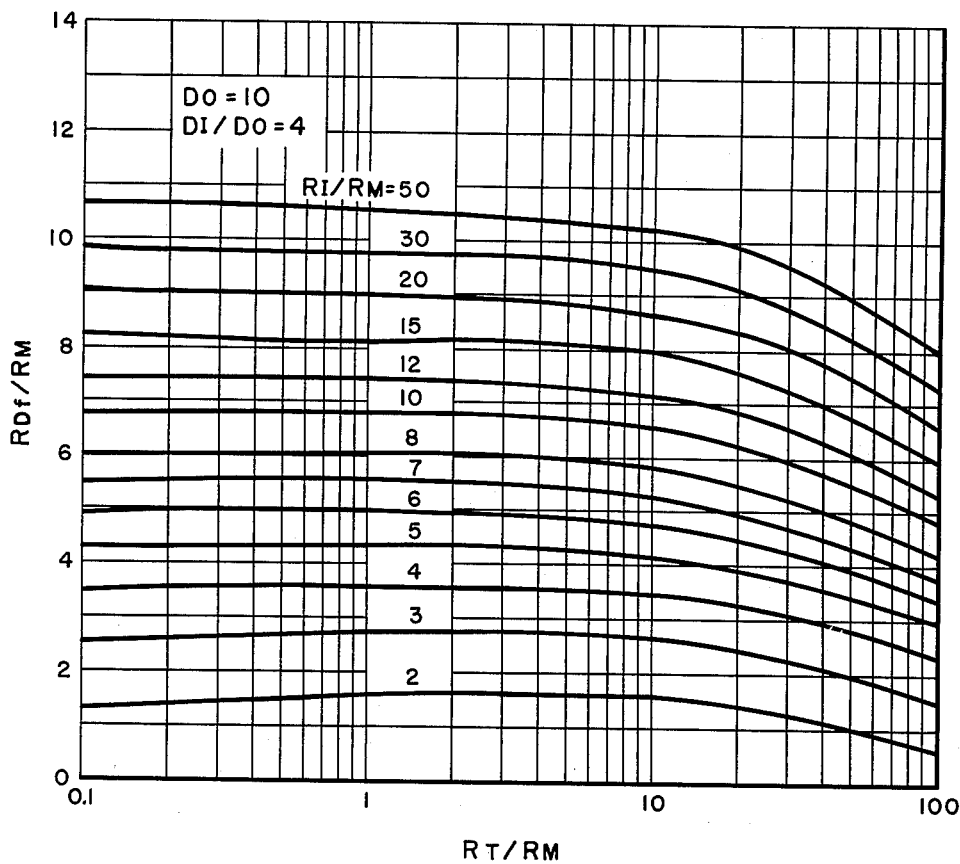
Figure 19A:
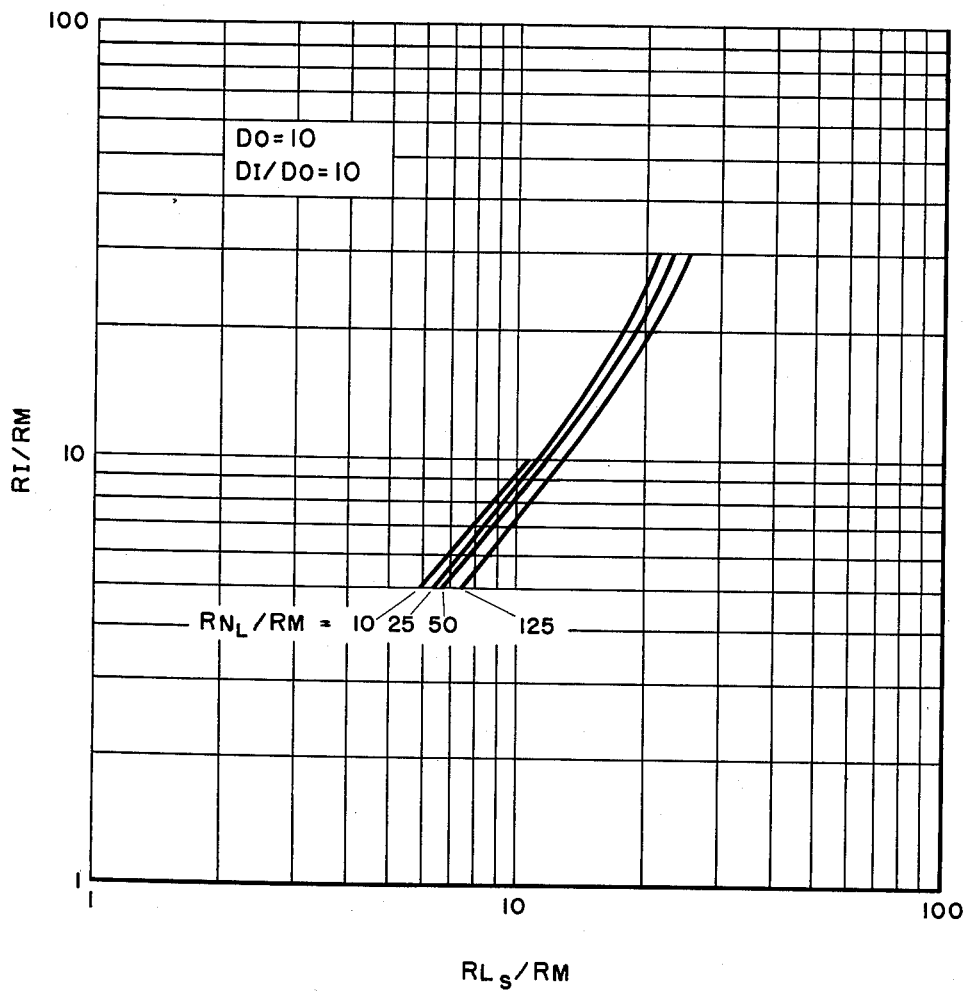
Figure 19B:
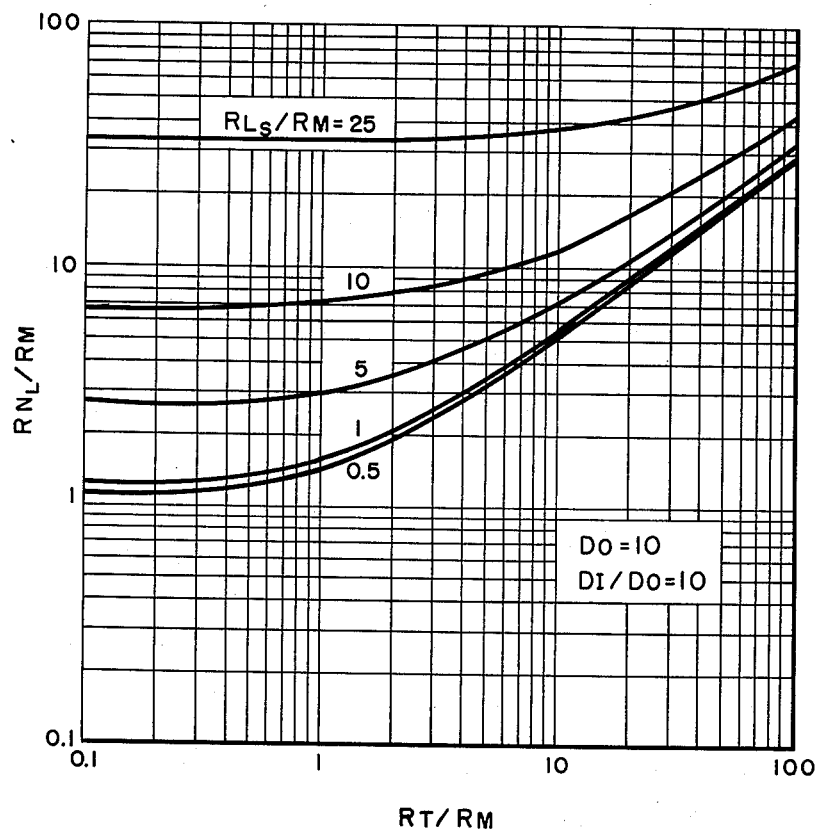

For example with $D_I/D_O = 2$, the graphs of Figures 17A–C are used as follows:

In Figure 17A, where abscissa value of 7.94 for $R_L/R_M$ intersects the $R_N/R_M$ curve of value 4.35, the ordinate value of the ratio $R_I/R_M$ (second column above table) is 15. Similarly, in Figure 17B, the value $R_T/R_M$ (table, 3rd column) is obtained by plotting abscissa $R_N/R_M = 4.35$ to curve $R_L/R_M = 7.94$, the intersection of which gives the ordinate value of $R_T/R_M = 2.0$. And again, from Figure 17C which is dependent on the graphs in Figures 17A and B, the abscissa value of 2 for $R_T/R_M$ is plotted to $R_I/R_M$ curve $R_I/R_M = 15$ to give ordinate value of $R_O/R_M$ (table, 4th column) equal to 6.7. By thus using the charts for $D_I/D_O$ ratios of 4 and 10, Figures 18A–C and 19A–C, respectively, the remaining entries of the above table are completed.

To determine the values of $D_I$, $R_I$, and $R_T$ for the formation under study previously referred to, the data of the above table are now interpolated with the value of $R_D/R_M = 6.66$ which had been determined from the differential curve in Figure 16, i.e., maximum $Df$ resistivity divided by the mud resistivity. Note that 6.66 stands intermediate of 6.7 and 6.3 in last column of the above table. The determination of the corresponding values in the other column is now one of a simple arithmetical interpolation; these are noted as the underscored values. From these interpolated values, the following values of formation properties are obtained:

Diameter of zone invaded by drilling fluid, $D_I = 2.2 \times 10 = 22$ inches

Resistivity of invaded zone, $R_I = 14.4 \times 1.7 = 24.5$ ohms-meter

Resistivity of undisturbed formation, $R_T = 1.95 \times 1.7 = 3.32$ ohms-meter

Figure 20:
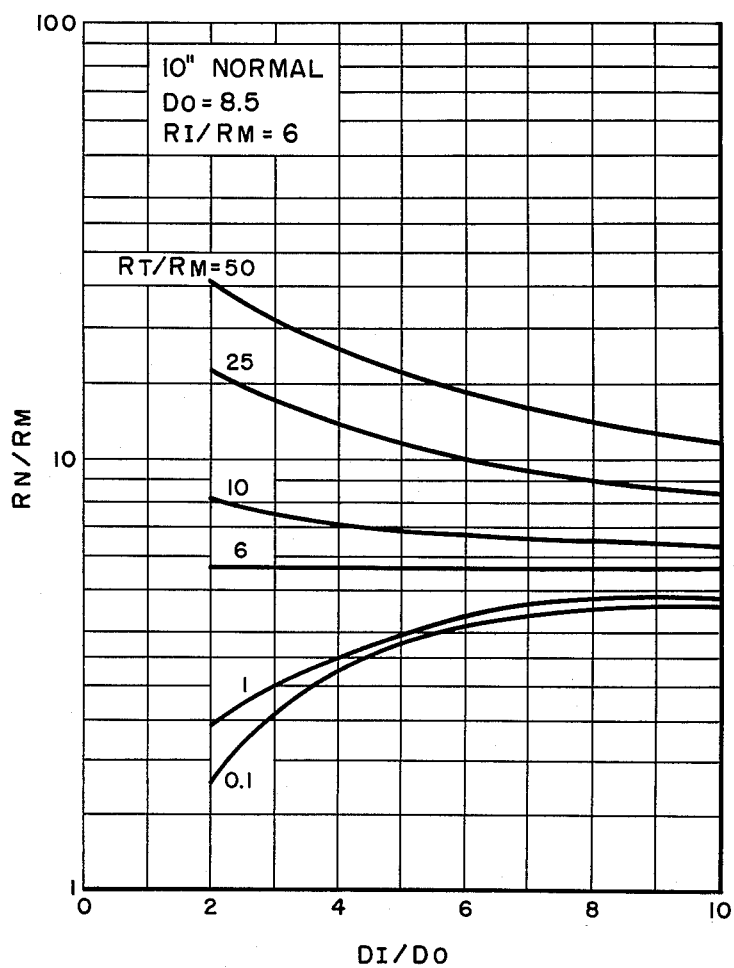
Figures 20–25 illustrate departure curves demonstrating the different radii of investigation of the different logging devices.

Figure 20 shows a plot of the apparent resistivity of a 10-inch short normal divided by the mud resistivity ($R_N/R_M$) versus the diameter of the invaded zone divided by the hole diameter ($D_I/D_O$) for various values of the ratio of true resistivity to mud resistivity ($R_T/R_M$). The plot is made for a constant value of the invaded zone resistivity ($R_I/R_M = 6$) and for a hole diameter of 8.5 inches. Note that even for an invasion diameter equal to 10 hole diameters, the influence of the resistivity beyond the invaded zone ($R_T$) is still appreciable and cannot be neglected.

Figure 21:
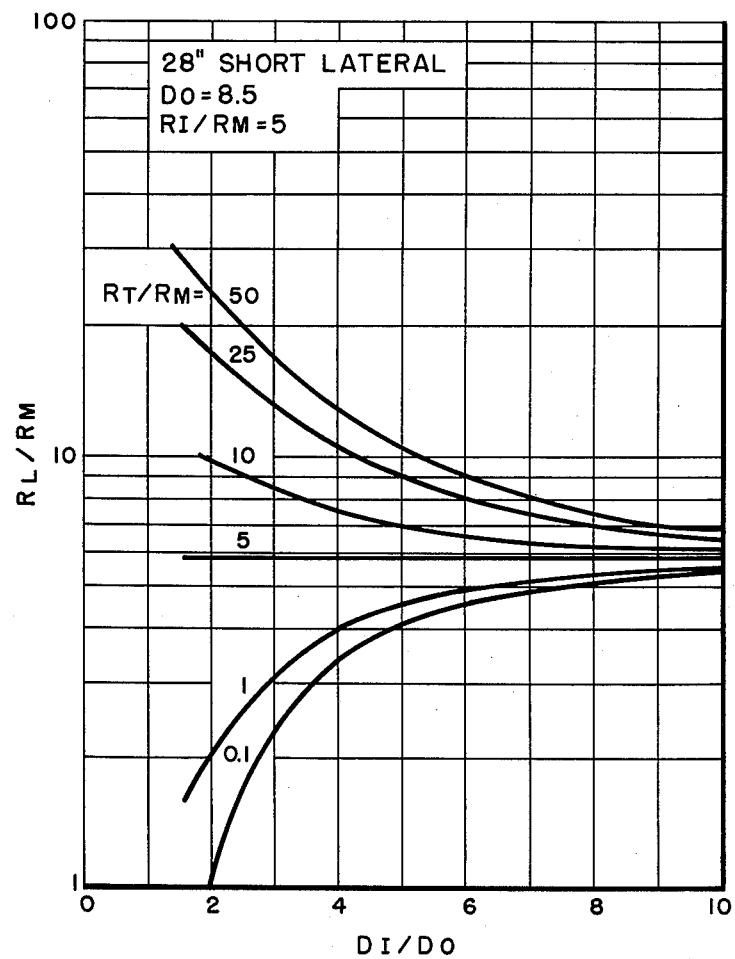

Figure 21 shows a similar plot for a 28-inch short lateral, for $R_I/R_M = 5$. In this plot, $R_L$ denotes the apparent resistivity of the short lateral. The influence of $R_T$ becomes small for $D_I/D_O > 8$.

Figure 22:
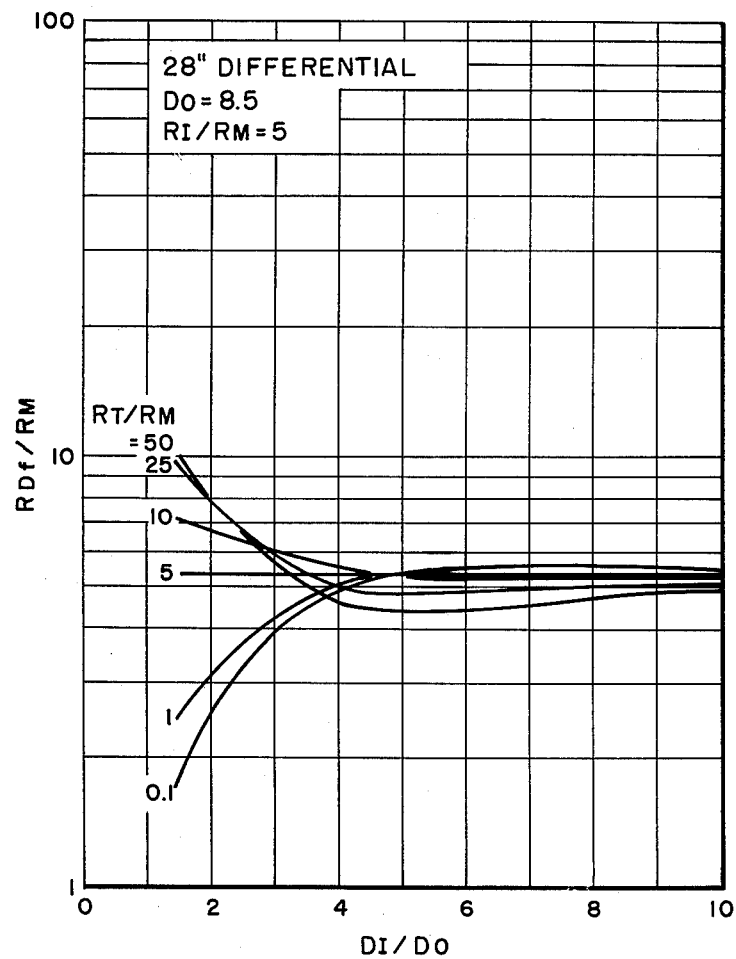

Finally, Figure 22 is a comparative plot for the 28-inch differential log (apparent resistivity denoted by $R_D$). We see that for this curve, the influence of $R_T$ is small in most cases.

The assumption that the apparent resistivity, when corrected for hole effect, gives a good approximation of the invaded zone resistivity, independent of the value of $R_T$, holds therefore much more generally true for the differential log than for conventional short normals or short laterals.

*Departure curve behavior of the differential log*

The plot of Figure 22 shows that, for all regions with at least moderate drilling fluid invasion, the differential logging curve is, for practical purposes, independent of $R_T$ and gives, therefore, an accurate measure of the invaded zone resistivity when a correction is made for the effect of the bore hole. The effect of $R_T$ on the differential log may be readily neglected so that a single family of simplified departure curves suffices to make an $R_I$ correction for any given hole diameter.

Figure 23:
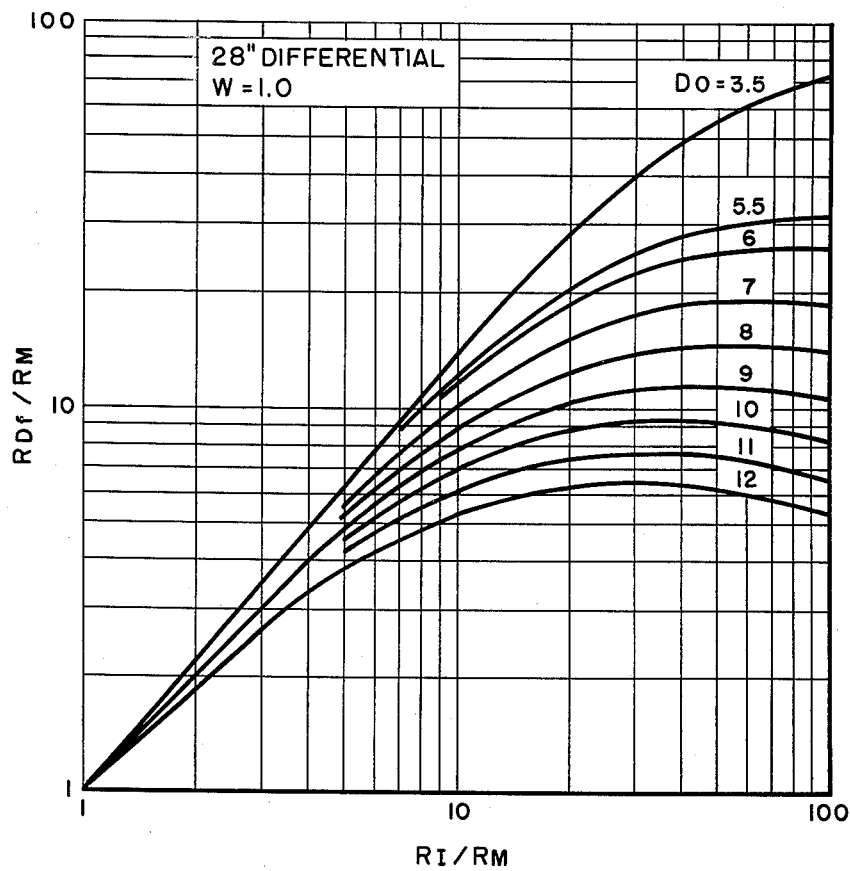

Figure 23 shows plots of $R_{Df}/R_M$ versus $R_I/R_M$ for a 28-inch differential log with effective hole diameters ranging from 3.5 to 12 inches. These graphs can be used directly to find $R_I/R_M$ from a differential log measurement of apparent resistivity after dividing it by the resistivity of the drilling mud at formation temperature.

Upon close examination of Figure 23, it will be noted that for each hole diameter, the $R_{Df}/R_M$ values reach a definite maximum. The larger the hole diameter, the lower will be the maximum value of $R_{Df}/R_M$.

This behavior limits the applicability of such graphs to formations of low resistivity. If $D_O$, the hole diameter, is larger than 9 inches, the resolution of the differential resistivity curves becomes insufficient if $R_I/R_M = 20$. For smaller hole diameters, the resolution is good up to values of $R_I/R_M$ equal to 30, or even 50 for extremely small hole diameters.

I have devised a compensating means to avoid this disadvantage of the form of the differential log described in connection with simple arrangement shown in Figure 4. This simple form of the differential log is limited principally to formations of high porosity which have a low formation factor and therefore a low value of $R_I/R_M$.

For the investigation of formations of intermediate and high resistivities, the limitations of the differential log referred to above can be removed by a slight change in instrumentation.

Figures 14, 15:
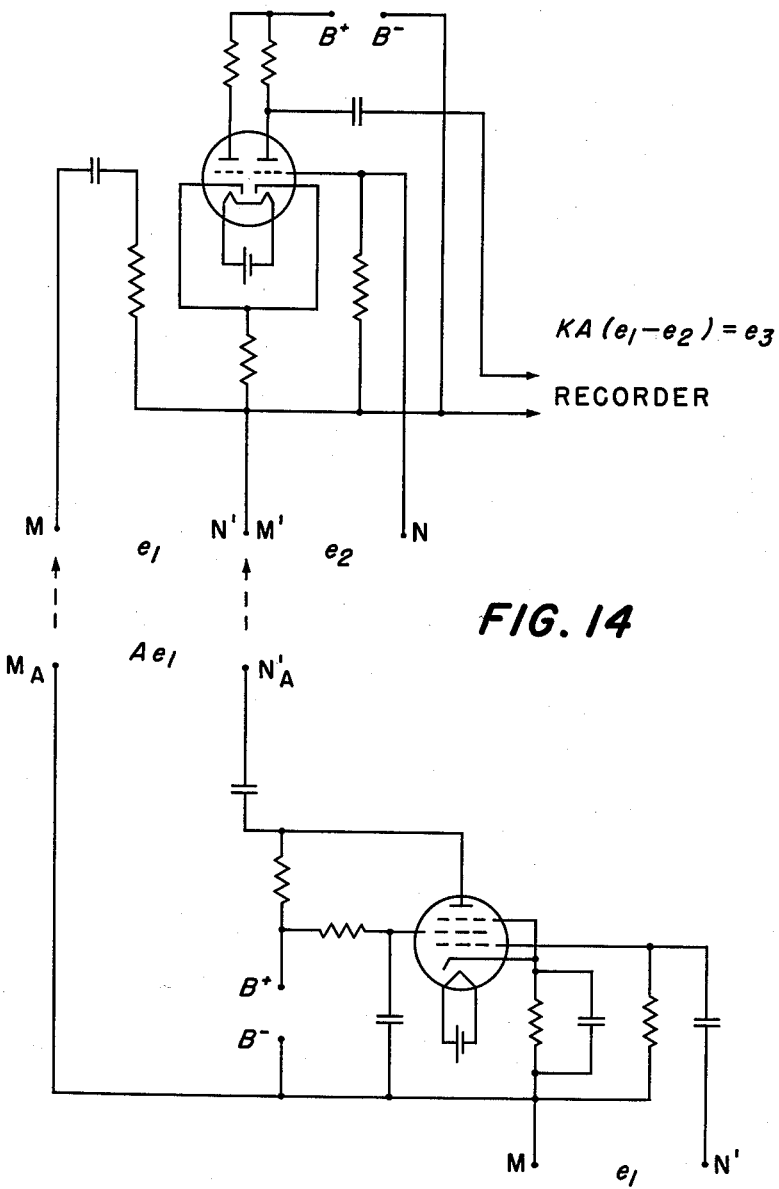
Figure 14 illustrates one form of electronic-signal (voltage) subtraction circuit used in conjunction with the logging arrangements shown in Figures 5 and 6.
Figure 15 illustrates a form of signal or voltage multiplication (amplifier) circuit which may be employed with the subtractor (Figure 14) to fulfill certain requirements of the logging circuit illustrated in Figure 8.

To raise the ceiling of the apparent differential resistivity values, the signal from one of the pick-up electrodes is weighted preferentially to the other before combining them for the signal which is fed to the recorder. Instead of directly measuring the potential difference between the electrodes M and N, the potentials of M and N are treated separately with reference to a surface electrode M' as illustrated (Figure 8). The signal MM' may be either increased by a certain weighting factor, W, or for an equivalent purpose it may be decreased by that factor before the two signals are electrically subtracted one from the other. Where the recording device consists of an amplifier-rectifier arrangement, the amplification of one component of the differential logging signal is accomplished by simply feeding the two signal components into separate amplifier channels, adjust the difference in amplification to the proper factor, and subtract the output of the channels, such as depicted in Figure 5. This weighting of the differential log signals may be accomplished by such electronic means as are illustrated in Figures 14 and 15. One signal component, $e_1$, is fed into the amplifier of Figure 15 at conductor connections for electrodes M—N'. The amplified output, $Ae_1$, therefrom is fed into the subtractor circuit shown in Figure 14 for the $e_1$ input as shown. The other component, $e_2$, of the differential logging signals is also fed into the latter circuit (Figure 14) at the M'—N cable connectors as shown. The resulting weighted signal, $e_3$, from the subtractor then passes to the logging recorder.

Figure 24:
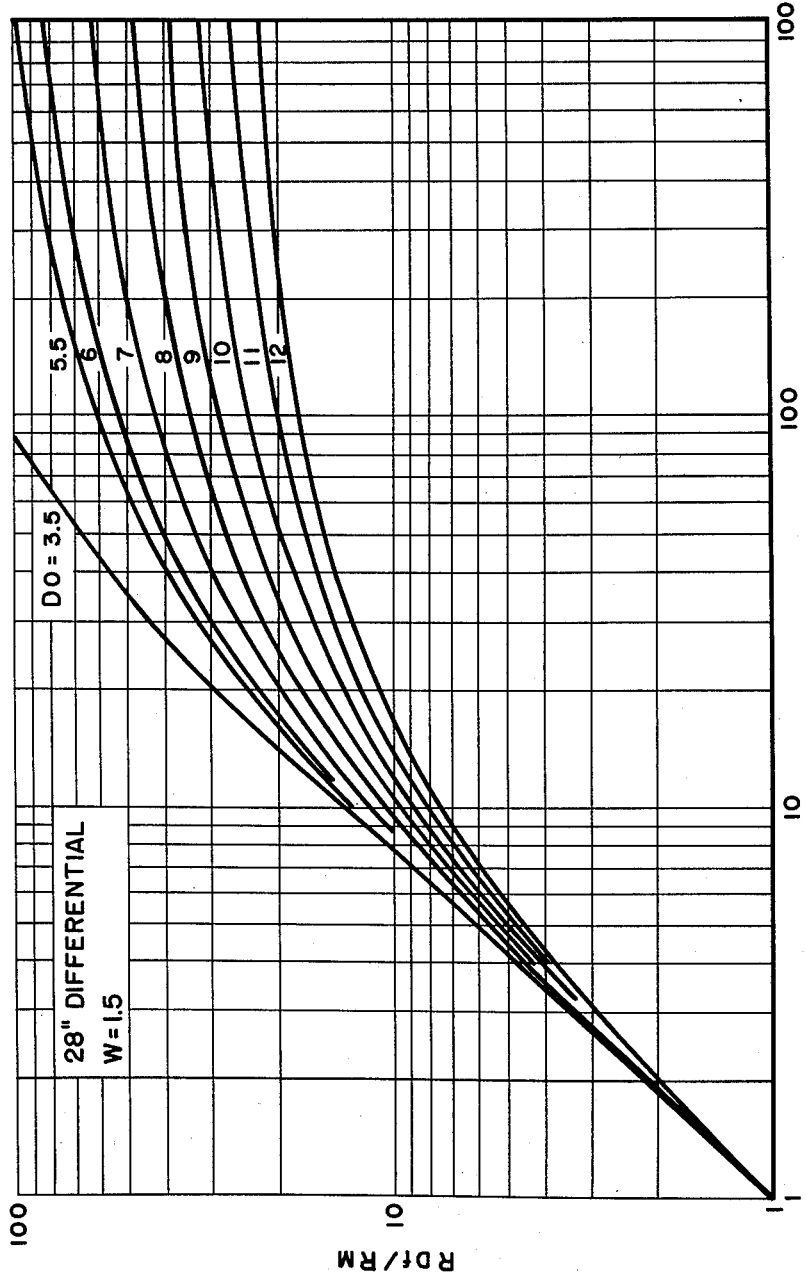
Figure 25:
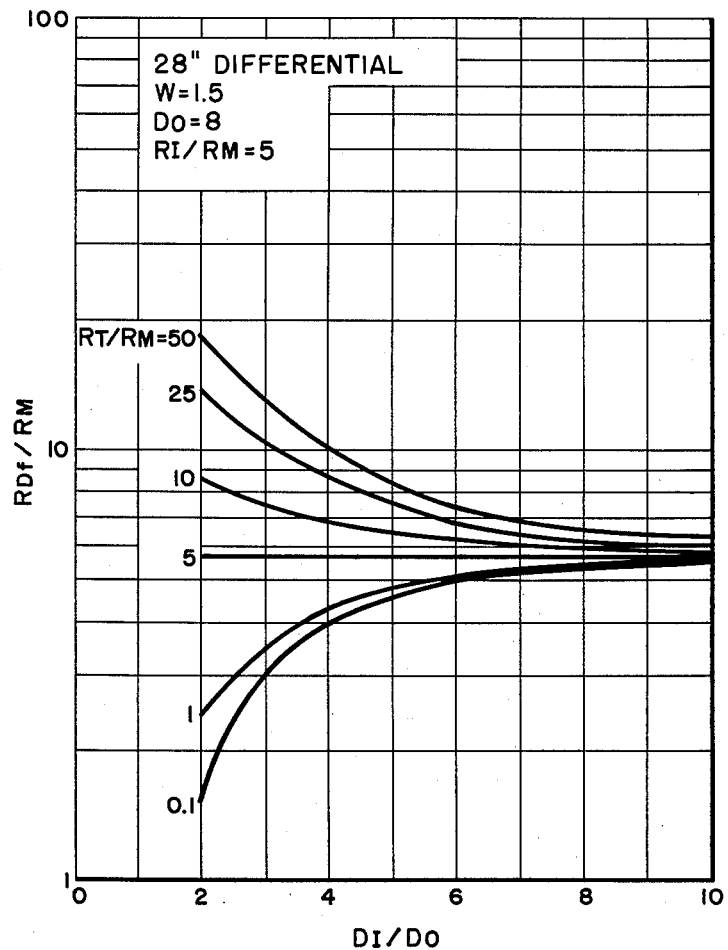

Plots, shown in Figure 24 as departure curves, made of $R_{Df}/R_M$ versus $R_I/R_M$ for various values of a weighting factor, W, show that for $W = 1.5$, sufficient resolution in the $R_I$ determination is obtained for all values of $R_I/R_M$ of practical interest.

Figure 26:
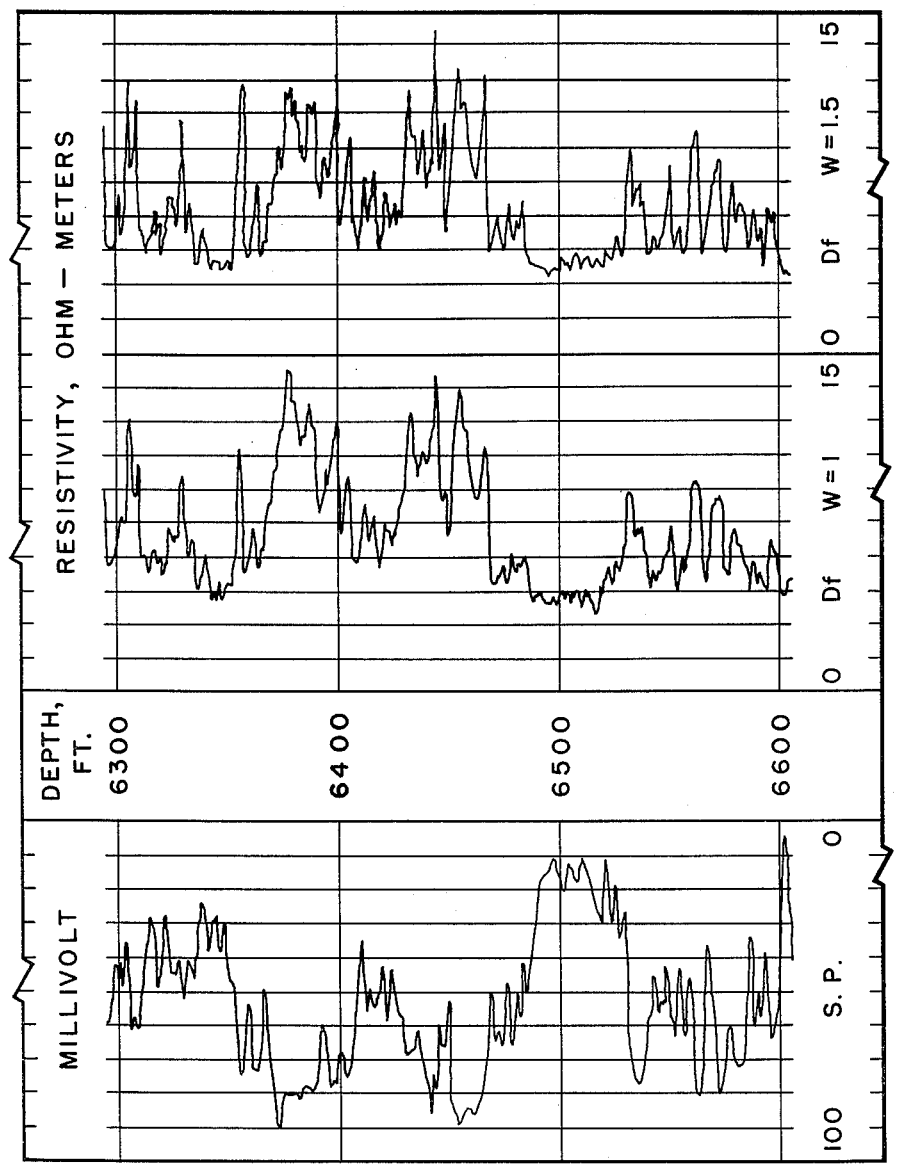

Experimental comparison runs have shown that there is little difference in the detail of the differential curve when W is changed from 1 to 1.5. For values of the signal weighting factor, W, larger than 1.5, the detail of the curve starts to diminish. At the exact value of $W = 1.5$, the detail of the curve appears to be even somewhat better than for a differential log conducted with $W = 1$. Figure 26 shows a comparison run of the two curves in a 10⅝-inch hole.

For all regions of intermediate and high resistivities, the weighted differential log conducted with $W = 1.5$ becomes a very satisfactory short investigation curve of much greater quantitative usefulness than the conventional short normal logging device.

The following example demonstrates another field application of my differential logging system:

EXAMPLE II

Figure 27 shows a log record through a section of thinly interbedded sandstones and shales, where a short normal has been replaced by the differential log which has in addition been amplified prior to recording to better provide for both detailed correlations and for "sand counting."

The bed at 7,123 to 7,133 feet gives an average apparent resistivity for the 28-inch differential log of 12 ohm-meter ($w = 1.5$). The value of $R_M$ at the formation temperature of 160° F. is 0.8 ohm-meter; so that $R_D/R_M = 15$. The hole diameter is 10⅝ inches, which gives an effective hole diameter of 10.3 inches when adjusted for diameter of sonde or electrode carrier used which is 2.5 inches. The value of $R_I/R_M = 26.5$ for these data is obtained from Figure 24. The formation under study here is a clean sand so that any influence of interstitial clays will be very small, and an approximation of the formation factor, $F \approx R_I/R_M = 26.5$ can be made (if no residual oil is present in the invaded zone). The resistivity of the connate water $R_W$ in this sand was found to be 0.098 ohm-meter. Using this value of $R_W$, we find that the value of the resistivity for the one hundred percent water saturated formation is $$R_o = FR_W = 2.6$$

ohm-meter. Making departure curve corrections for the long lateral log, we find as a rough approximation of the formation resistivity $R_T \approx 2.2$ ohm-meter. This shows that the bed is definitely a water sand and that no hydrocarbons are present. From empirical relations established between formation factor and porosity, the porosity of the sand may be calculated from $F \approx R_I/R_M$. Using the empirical relation, $$F = 0.62 p^{-2.15}$$

where $p$ is the fractional porosity. For $F=26.5$, we find $p=.177$, which means a porosity of 17.7 percent.

It is apparent that many modifications and variations of the invention as hereinbefore set forth may be made without departing from the spirit and scope thereof. The specific embodiments described are given by way of example only and the invention is limited only by the terms of the appended claims.

Other modes of applying the principle of the invention may be employed, change being made as regards the details described, provided the features stated in any of the following claims or the equivalent of such be employed.

I, therefore, particularly point out and distinctly claim as my invention:

1. An apparatus for electrically logging a bore hole filled with an aqueous liquid comprising: a housing adapted to be lowered by a cable means axially into said bore hole; a pair of current emitting electrodes mounted in fixed space relationship on said housing; a pair of voltage pickup electrodes mounted in fixed space relationship a fixed distance from said current emitting electrodes, the spacing between each of said current emitting electrodes and the spacing between each of said voltage pickup electrodes being substantially less than the average distance between said pairs of electrodes; a voltage generating means having first and second output terminals, said first and second output terminals connected to said first and second current emitting electrodes, respectively; subtraction means having first and second inputs and a common terminal and an output; recording means connected to said output, said first and second voltage pickup means connected to said first and second inputs of said subtraction means, respectively; a reference electrode mounted at a distance remote from said current emitting electrodes; means connecting said remote electrode to said common terminal of said subtraction means whereby the second differential of potential of said voltage pickup electrodes with regard to said remote electrode versus the depth of said apparatus in said bore hole is obtained.

2. A device as described in claim 1 and further particularized in that the signal from said output from said generating means is a repetitive arbitrarily alternating signal.

3. An apparatus as described in claim 1 and further characterized in that said subtraction means selectively amplifies the signals applied to said first and second inputs.

4. An apparatus for electrically logging a bore hole filled with an aqueous liquid comprising: a housing adapted to be lowered by a cable means axially into said bore hole; a pair of current emitting electrodes mounted in fixed space relationship on said housing; a pair of voltage pickup electrodes mounted in fixed space relationship a fixed distance from said current emitting electrodes, the spacing between each of said current emitting electrodes and the spacing between each of said voltage pickup electrodes being substantially less than the average distance between said pairs of electrodes; voltage generating means connected to said current emitting electrodes; subtraction means; means for applying the voltage pickup by said voltage pickup electrodes to said subtraction means, said subtraction means being adapted to subtract the voltage pickup from one electrode from the voltage pickup from the other electrode; and means for recording said resultant subtracted voltage as a function of depth within said bore hole, whereby the second differential of said voltage pickup electrodes with regard to said current emitting electrodes versus the depth of said voltage pickup electrodes is obtained.

5. An apparatus for electrically logging a bore hole filled with an aqueous liquid comprising: a housing adapted to be lowered by a cable axially into said bore hole; a first current emitting electrode mounted on said housing; a first pair of voltage pickup electrodes mounted in fixed space relationship on said housing a fixed distance from said current emitting electrodes; a second pair of voltage pickup electrodes mounted in fixed space relationship on said housing and a fixed distance from said first pair of voltage pickup electrodes; a second current emitting electrode mounted a distance not less than twice the distance from said first current electrode to the midpoint between said pairs of voltage pickup electrodes, the spacing between said first current emitting electrode and the spacing between each of said electrodes in said first pair of voltage pickup electrodes and each of said electrodes in said second pair of voltage pickup electrodes being substantially less than the average distance between said current emitting electrodes and either of said pairs of voltage pickup electrodes; generating means having a signal output connected to said first and second current emitting electrodes; subtraction means having first and second inputs and an output, said first pair of voltage pickup electrodes connected to said first input, said second pair of voltage pickup electrodes connected to said second input, recording means having a signal input, the output from said subtraction means connected to the signal input of said recording means whereby the potential difference between the individual electrodes of said first pair of voltage pickup electrodes due to said current emitting electrodes is subtracted from the voltage difference between said electrodes of said second pair of voltage pickup electrodes due to said current emitting electrodes and the signal representing the subtracted quantity is thereby recorded versus the position of said apparatus in said bore hole, said recorded signal being representative of the second differential of potential with regard to the distance from said current electrode pair versus depth in said bore hole.

6. A device as described in claim 5 and further particularized in that the signal from said output from said generating means is a repetitive arbitrarily alternating signal.

References Cited in the file of this patent

UNITED STATES PATENTS

| | | |
|---|---|---|
| 1,819,923 | Schlumberger | Aug. 13, 1931 |
| 2,174,638 | Schlumberger | Oct. 3, 1939 |
| 2,393,009 | Chun | Jan. 15, 1946 |
| 2,531,088 | Thompson | Nov. 21, 1950 |
| 2,617,852 | Waters | Nov. 11, 1952 |
| 2,728,047 | Doll | Dec. 20, 1955 |
| 2,770,771 | Schuster | Nov. 13, 1956 |